United States Patent [19]

Blümner

[11] Patent Number: 4,486,698

[45] Date of Patent: Dec. 4, 1984

[54] METHOD FOR OPERATING A FREQUENCY CONVERTER WITH INTERMEDIATE DC LINK FOR SUPPLYING A ROTATING-FIELD MACHINE

[75] Inventor: Christoph Blümner, Höchstadt, Fed. Rep. of Germany

[73] Assignee: Siemens Aktiengesellschaft, Berlin and Munich, Fed. Rep. of Germany

[21] Appl. No.: 290,313

[22] Filed: Aug. 5, 1981

[30] Foreign Application Priority Data

Aug. 12, 1980 [DE] Fed. Rep. of Germany ....... 3030465

[51] Int. Cl.³ .............................................. H02P 1/46
[52] U.S. Cl. .................................... 318/721; 318/723; 318/803
[58] Field of Search ............... 318/721, 723, 722, 724, 318/779, 803, 809, 798–802, 807, 808, 810–811; 363/37, 49, 80, 98

[56] References Cited

U.S. PATENT DOCUMENTS 4,230,979 10/1980 Espelage ............................. 318/721
4,276,504 6/1981 Nagase ................................. 318/721
4,295,085 10/1981 Lafuze .................................. 318/721

Primary Examiner—J. V. Truhe
Assistant Examiner—Patrick Keane
Attorney, Agent, or Firm—Kenyon & Kenyon

[57] ABSTRACT

A method for operating a frequency converter of the type having an auxiliary commutating device for commutation at speeds which are lower than a machine-related minimum speed of operation. In a first speed range which begins at speed zero, the thyristors of a three-phase bridge of the inverter are commutated cyclically, as customary, six times per revolution of the machine. In a second speed range which is adjacent to the first speed range and below the machine-related minimum speed of operation, only every second commutation is executed. In embodiments of the invention wherein there is provided a third speed range which is adjacent to the second speed range and extending up to the machine-related minimum speed, only every third commutation is executed. In this manner, an auxiliary commutating device having a predetermined frequency limit can be utilized at speeds corresponding to two or three times the speed at which such an auxiliary commutating device could be used in prior art systems. Only slight drops in mean torque are experienced with the inventive method.

2 Claims, 12 Drawing Figures

METHOD FOR OPERATING A FREQUENCY CONVERTER WITH INTERMEDIATE DC LINK FOR SUPPLYING A ROTATING-FIELD MACHINE

BACKGROUND OF THE INVENTION

This invention relates generally to methods for operating frequency converters with intermediate DC links, and more particularly, to a method for operating a frequency converter wherein the rotation of a rotating field machine is divided into a plurality of speed ranges, each such speed range having an predetermined associated number of commutations per revolution of the machine.

Siemens-Zeitschrift 45 (1971), pages 753 to 757, and German Pat. No. 22 46 562, teach a method for operating a frequency converter of the type having an intermediate DC link, the inverter having converter valves arranged in a three-phase bridge circuit. The converter supplies electrical energy to a rotating field machine which serves as a load; the rotating field machine being operated at speeds which are higher than a predetermined minimum speed. In the known system, the converter is controlled by the load so that, at speeds above the predetermined minimum speed, the commutating voltage for the converter valves in the inverter are supplied by the rotating field machine. However, at speeds which are slower than the minimum speed, the converter valves of the inverter are commutated by an auxiliary commutating device. In situations where the speed of rotation of the machine is higher than the minimum speed, cyclical commutation occurs six times during each revolution of the machine, the commutations occurring alternately in both halves of the three-phase bridge. Commutation is achieved from a converter valve in a converter branch, to a subsequently current-carrying converter valve of a converter branch in the same bridge half.

In the known converter system, the reactive power for the commutation of the motor current can be obtained from the rotating machine itself at or beyond a predetermined machine operating speed. In the speed range between zero revolutions and the minimum speed which corresponds to approximately one-tenth of the nominal speed of the converter motor, separate commutation aids must be used, particularly during start-up. An additional auxiliary commutating device, or an additional auxiliary start-up commutating device, causes switching of the machine current in the low range of speeds.

The foregoing references teach the manner by which the intermediate link current can be made to have a zero magnitude for a brief period of time by either controlling a rectifier on the network side or by energizing a controlled bypass valve which operates as a switch to short the intermediate link choke. During the brief period of time that the intermediate link current is zero, the current is passed-on to the next machine leg. German Pat. Nos. 22 46 562 and 22 46 592 teach other auxiliary commutating devices by which the intermediate link current is shorted prior to each commutation. The auxiliary commutating systems described therein are suitable for machines having large start-up torques and power ratings.

In systems wherein energy is supplied to rotating-field machines which have high nominal speed, or machines having large numbers of poles, the known auxiliary commutating methods reach their frequency response limit before the necessary minimum speed is reached, and before the load-controlled inverter can commutate the motor current in response to machine voltage. In such cases, other relatively expensive start-up devices, illustratively starter motors or start-up transformers, must be utilized.

It is, therefore, an object of this invention to provide a method for operating a frequency converter of the type having an intermediate DC link in such a manner that the speed range in which forced commutation is supplied does not exceed the frequency limits of conventional auxiliary commutating devices.

SUMMARY OF THE INVENTION

The foregoing and other objects are achieved by this invention which provides a method of operating a frequency converter wherein speeds which are lower than a predetermined minimum speed are subdivided into at least two speed ranges. In one embodiment, a first speed range, which starts at speed zero, has six commutations performed during each revolution of the rotating-field machine. In a second speed range which follows the first speed range, three cyclic commutations are performed per revolution of the machine. Upon the occurrence of each such commutation in the converter branches of both bridge halves of a three-phase bridge circuit, commutation from a converter valve of one converter branch to a further current-carrying converter valve of another converter branch occurs simultaneously in both bridge halves.

In accordance with the inventive method, only every second commutation is performed during operation of the machine in the second speed range; the second speed range having a maximum speed which corresponds to the minimum speed of the machine. In this manner, the speed range of the forced commutation is doubled with respect to the frequency limits of the auxiliary commutating device. Moreover, full machine torque is maintained for speeds in the first speed range, which is important for the "break-loose" torque. Although the average value of torque drops, and a torque ripple occurs, in the second speed range, this is normally not objectionable at such speeds.

In embodiments of the invention wherein the lower speeds of the rotating-field machine are divided into three speed ranges, only two cyclic commutations per revolution preferably occur within the third speed range which includes a maximum speed which corresponds to the minimum speed of the rotating-field machine. In such an embodiment, the three-phase bridge is operated as a single-phase bridge by maintaining the converter valves of two converter branches connected to a main terminal unfired. In this manner, only every third commutation is executed by the inverter, thereby permitting the frequency limit of each of the conventional auxiliary commutating devices to be tripled. The average magnitude of the torque in this third speed range drops only slightly as compared to the average torque in the second speed range, and the torque ripple is only slightly increased.

BRIEF DESCRIPTION OF THE DRAWINGS

Comprehension of the invention is facilitated by reading the following detailed description in conjunction with the annexed drawings, in which.

DETAILED DESCRIPTION

Figure 1:
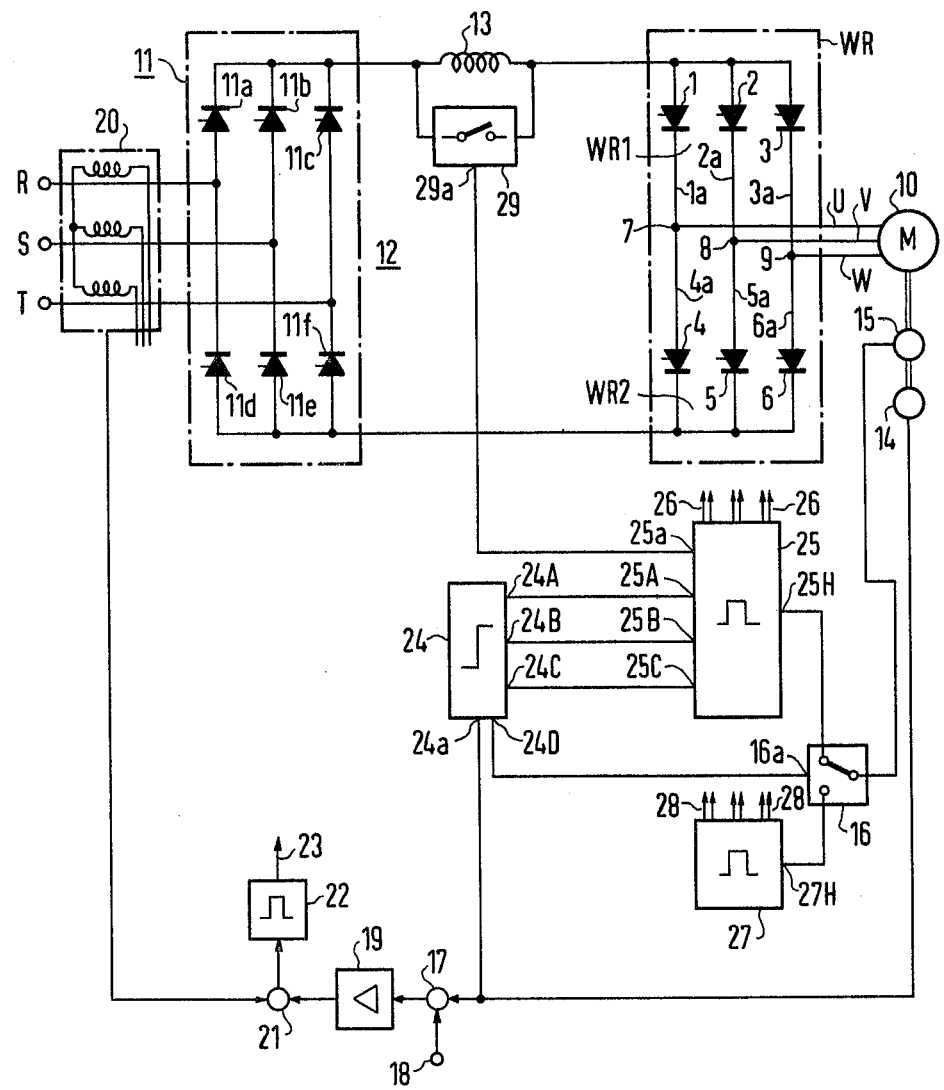
FIG. 1 is a block and schematic representation of a controlled inverter which may be operated in accordance with the inventive method.

FIG. 1 shows a block and schematic circuit diagram of a converter. A controlled inverter WR contains controlled converter valves 1 to 6 in a three-phase bridge circuit. The converter is divided into two bridge halves WR1 and WR2, containing converter branches 1a, 2a, and 3a; and 4a, 5a, and 6a, respectively. The converter branches in each of the bridge halves are connected to associated converter branches in the other bridge half, and to a three-phase winding of a synchronous machine 10, the connections being made at terminals 7, 8, and 9. Terminals 7, 8, and 9 supply multiphase voltage u, v, and w to machine 10. Inverter WR is supplied electrical energy from a three-phase network having phase conductors R, S, and T, via a controlled rectifier 11 and an intermediate DC link 12. Intermediate DC link 12 is provided with an intermediate circuit comprising a smoothing inductance 13. Rectifier 11, in the exemplary embodiment, is constructed from six controlled converter valves 11a through 11f in a three-phase bridge circuit. Controlled converter valves 1 through 6 of inverter WR, and controlled converter valves 11a through 11f of rectifier 11 may be thyristors.

Synchronous machine 10, which may be a three-phase synchronous motor, has a rotor (not specifically identified) which is mechanically coupled to a rotor position transmitter 15 and a tachometer generator 14. Rotor position transmitter 15 may be provided with permanent magnets or Hall generators. The rotor position transmitter is coupled at its output to a double-throw switch 16. Tachometer generator 14 provides at its output signals which correspond to the actual speed of the synchronous machine, the speed signals being compared in an adding stage 17 with a signal corresponding to a set speed value; the set speed value signal being provided at an input 18 of adding stage 17. The output of adding stage 17 is a control deviation signal which is conducted to an input of a speed control 19. Speed control 19 is coupled at its output to an input of a second adding stage 21. Second adding stage 21 receives at a further input a signal from a current transformer 20 which is arranged at phase conductors R, S, and T. A current regulator 22 is coupled at its input to the output of second adding stage 21, and is provided with a plurality of output lines 23 which are connected to converter valves 11a to 11f of rectifier 11. The literature references mentioned hereinabove describe the manner in which the valves in controlled rectifier 11 are addressed.

The speed signal at the output of tachometer generator 14 is additionally conducted to an input 24a of a limit indicator 24. Limit indicator 24 produces a signal A at output terminal 24A which indicates that the speed of the machine is within a first speed range (speed range I), the first speed range being within speed zero and a first preselectable speed. The limit indicator provides further signals B and C at output terminals 24B and 54C, respectively; these speed signals being indicative of second and third speed ranges (speed ranges II and III, respectively). Speed range II begins with the first preselectable speed to a higher second preselectable speed, and speed range III is within the second preselectable speed and a third preselectable speed which corresponds to the minimum machine speed. If the minimum machine speed is exceeded, limit indicator 24 produces a responsive signal D. Output terminals 24A to 24C of limit indicator 24 are connected to respectively associated input terminals 25A to 25C of a first control unit 25. The make contact of double-throw switch 16 is connected to an input terminal 27H of a second control unit 27. If the actual speed value determined by tachometer generator 14 exceeds the preset minimum speed of machine 10, signal D causes double-throw switch 16 to change state so that the output of rotor position transmitter 15 is switched from input 25H of control unit 25 to input 27H of control unit 27. Control unit 27 addresses controlled converter valves 1 through 6 of inverter WR by means of output lines 28.

As shown in the illustrative embodiment of FIG. 1, a switch 29 is provided which functions as an auxiliary commutation arrangement which, when closed, short circuits intermediate link inductance 13. Switch 29 is provided with a control input terminal 29a which is connected to an output 25a of first control unit 25. At speeds below the minimum machine speed, switch 29 is closed in response to a brief signal at control input terminal 29a, thereby short circuiting the intermediate link inductance for every commutation, and the intermediate link current is thereby made zero for a short time for each commutation. It should be noted that any other auxiliary commutation system may be used instead of switch 29 with the inventive method.

Figure 2:
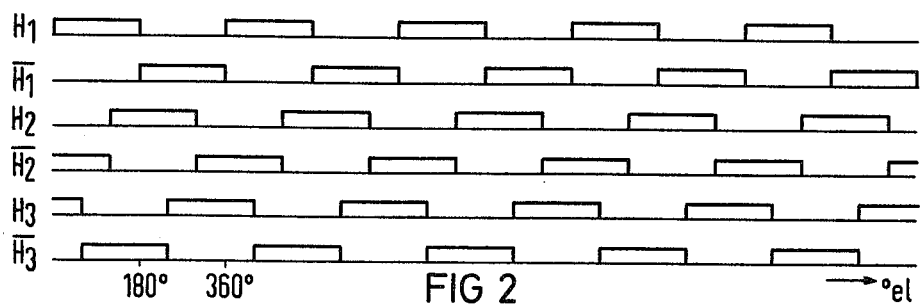
FIGS. 2, 3, 4, 5, and 6 are pulse timing diagrams which are plotted with respect to electrical degrees during the revolution period of a synchronous motor load.
Figure 3:
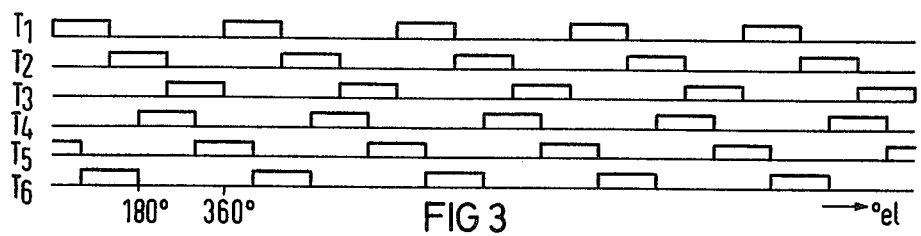

FIGS. 2, 3, 4, 5, and 6 are pulse timing diagrams which are useful for explaining the inventive method of operating the converter of FIG. 1, at speeds which are lower than the minimum machine speed. As shown in FIGS. 2 through 6, the pulse diagrams are plotted along electrical degree scales, the degrees corresponding to the revolutions of synchronous machine 10. FIG. 2 shows signals $\overline{H_1}$, $\overline{H_2}$, and $\overline{H_3}$ which are generated by rotor position transmitter 15. The duration of each pulse is 180°, the signals being phase shifted with respect to each other by 120°. Each of the signals $\overline{H_1}$ to $\overline{H_3}$ is inverted in an inverter stage (not shown in FIG. 1) to produce corresponding inverted signals $H_1$, $H_2$, and $H_3$. Signals $H_1$ to $H_3$, and $\overline{H_1}$ to $\overline{H_3}$ are conducted via double-throw switch 16 to input 25H of control unit 25 during the time that the speed of machine 10 is lower than the minimum machine speed. When the machine is operating in speed range I, which is indicated by the presence of signal A at output terminal 24A of limit indicator 24, a plurality of corresponding firing pulses $T_1$ to $T_6$ which are shown in FIG. 3, are generated to fire corresponding converter valves 1 through 6 in inverter WR. The rotor position signals (H) and their inversions $\overline{H}$) are related to the firing pulses (T) in accordance with the following logic equations:

$$H_1 \wedge \overline{H_2} = T_1$$

$$H_2 \wedge \overline{H_3} = T_2$$

$$H_3 \wedge \overline{H_1} = T_3$$

$$H_1 \wedge \overline{H_2} = T_4$$

$$H_2 \wedge \overline{H_3} = T_5$$

$$H_3 \wedge \overline{H_1} = T_6$$

Figure 4:
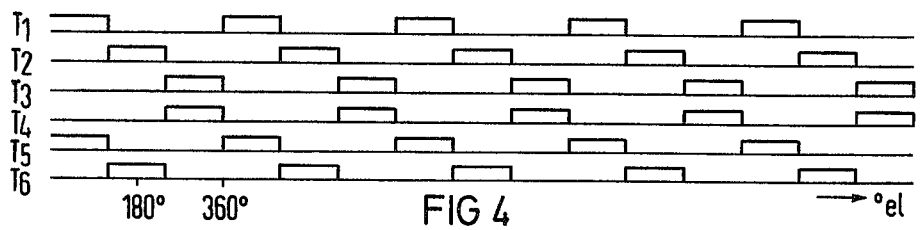
Figure 5:
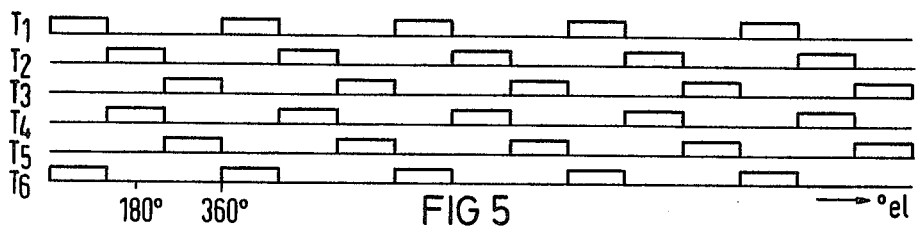

FIG. 3 shows that six commutations occur during each revolution of synchronous machine 10. For example, in speed range I, current may be commutated from converter valve 5 to converter valve 6 as the next current-carrying converter valve within one bridge half. The pulse diagram of speed range I corresponds to the pulse diagram by which inverter WR is clocked as a function of the load after the minimum machine speed has been reached, the reactive commutation power being supplied by synchronous machine 10. If speed range I is exceeded, signal B is present at output terminal 24B of limit indicator 24, signal B being indicative of speed range II. The presence of signal B causes the following relationships to exist in control unit 25:

$$H_1 \wedge \overline{H_2} = T_1; \; H_1 \wedge \overline{H_2} = T_5$$

$$H_2 \wedge \overline{H_3} = T_2; \; H_2 \wedge \overline{H_3} = T_6$$

$$H_3 \wedge \overline{H_1} = T_3; \; H_3 \wedge \overline{H_1} = T_4 \qquad (1)$$

and $$H_1 \wedge \overline{H_2} = T_1; \; H_1 \wedge \overline{H_2} = T_6$$

$$H_2 \wedge \overline{H_3} = T_2; \; H_1 \wedge \overline{H_3} = T_4$$

$$H_3 \wedge \overline{H_1} = T_3; \; H_3 \wedge \overline{H_1} = T_5, \qquad (2)$$

respectively, where the system of equations (1) corresponds to the pulse diagram of FIG. 4, and the system of equations (2) corresponds to the pulse diagram of FIG. 5. FIGS. 4 and 5 show that only every second commutation occurs during each revolution of machine 10 in speed range II. Thus, only three commutations occur per machine revolution. In each of bridge halves WR1 and WR2, commutation occurs simultaneously from one converter valve to a further converter valve. For example, in bridge half WR1, commutation occurs from converter valve 1 to converter valve 2, simultaneously with the occurrence of commutation from converter valve 6 to converter valve 4 in bridge half WR2. Thus, although the frequency response characteristics of auxiliary commutating device 29 remain unchanged the auxiliary commutating device performs commutation over a speed range which is twice as large that of speed range I.

Finally, if the speed signal delivered by tachometer generator 14 exceeds speed range II, signal C is present at output terminal 24c of limit indicator 24 to signify operation of the machine in speed range III. Signal C causes control unit 25 to operate in accordance with the following relationship:

$$H_1 = T_1; \; H_1 = T_6$$

$$\overline{H_1} = T_3; \; \overline{H_1} = T_4$$

Figure 6:
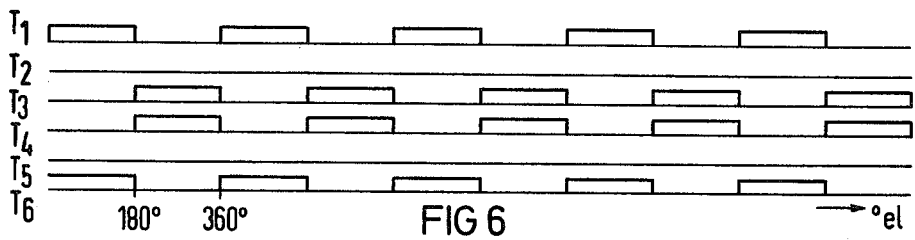

FIG. 6 illustrates the pulses which are generated when synchronous machine 10 is operated in speed range III. As shown, three-phase bridge WR is operated as a single-phase bridge wherein converter valves 2 and 5 which have a common terminal 8 in inverter WR remain unfired. As a result, auxiliary commutating device 29 produces forced commutation although the rate of rotation of synchronous machine 10 may be up to three times faster than the rate achieved in speed range I. After the machine reaches its minimum machine speed, signal D is present at output terminal 24D of limit indicator 24. Upon the occurrence of signal D, signals $\overline{H_1}$, $\overline{H_2}$, and $\overline{H_3}$ of the rotor position transmitter are coupled by double-throw switch 16 to control unit 27 at its input terminal 27H. This operation disengages control unit 25 and auxiliary commutating device 29. Control unit 27 produces firing pulses which are timed by the load in accordance with FIG. 3 and the associated logic equations. Reactive commutation power is provided by synchronous machine 10.

Figure 7:
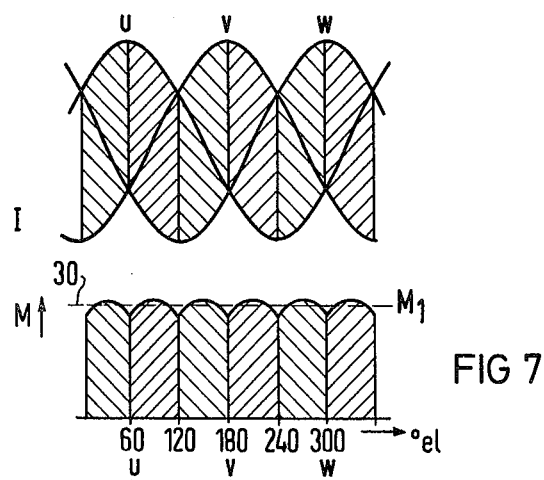
FIGS. 7, 8, and 9 are wave forms of various machine voltages plotted against, electrical degrees.
Figure 8:
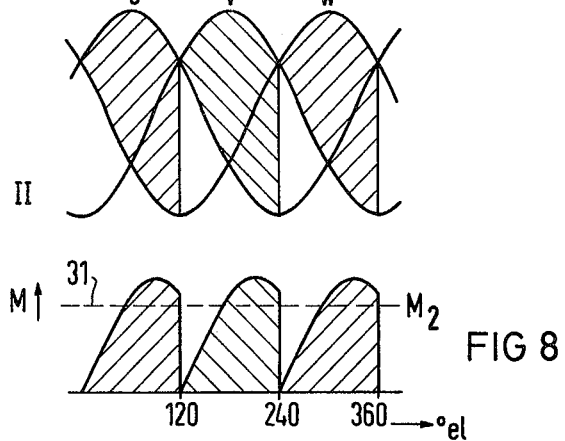
Figure 9:
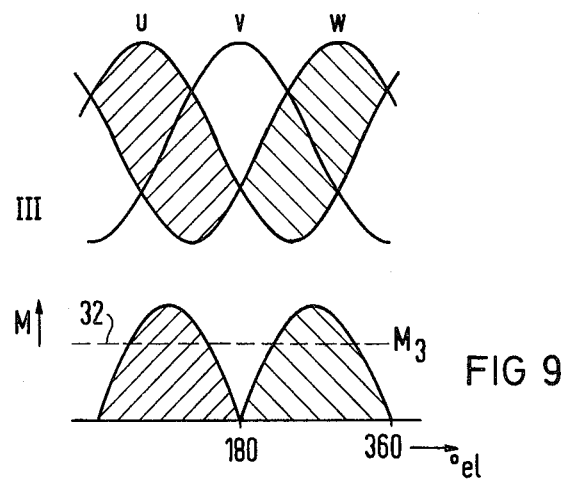

FIGS. 7, 8, and 9 illustrate the wave forms of machine voltages u, v, and w at respective windings of three-phase synchronous machine 10, and torque wave forms M. The voltage and torque wave forms are plotted with respect to electrical degrees of rotation. FIG. 7 shows the normal commutation in speed range I. An average torque $M_1$ is shown by line 30 to have a value of approximately 95% of the peak value of the torque.

FIG. 8 shows the wave forms of machine voltages u, v, and w in speed range II, and the corresponding torque wave form. In speed range II, as shown in FIG. 8, cyclic commutation in both bridge halves WR1 and WR2 occurs every 120°, in accordance with the pulses of FIG. 5. A dashed line 31 shows the mean torque $M_2$ which corresponds to a value of approximately 71% of the peak torque value, and therefore is lower than the mean torque of speed range $M_1$. Moreover, the magnitude of torque ripple is increased in speed range II. For most applications, the reduction in mean torque and the increase in the magnitude of torque ripple do not have significant effect. This is particularly true in embodiments wherein the converter of FIG. 1 is used to operate blowers, centrifuges, compressors, etc.

FIG. 8 further shows the advantages of the commutating method of FIG. 5, compared with the commutating method of FIG. 4. In FIG. 5, commutation always occurs at a torque which is substantially larger than zero. Brief reductions in torque which are caused by the forced commutation can produced a negative torque as a result of dead time. However, such brief torque reductions have virtually no adverse effect upon the operation of the system, especially when contrasted against the commutating method of FIG. 4, where forced commutation is initiated by a torque M which has a value near zero.

FIG. 9 shows wave forms u, v, and w, and the wave form of torque in speed range III. As noted, commutation in speed range III occurs every 180°. The magnitude of mean torque $M_3$ is approximately 64% of the peak torque, and therefore is slightly lower than mean torque $M_2$ of speed range II. Although the torque ripple has further increased, torque ripple does not significantly affect operation of the synchronous machine.

Figure 10:
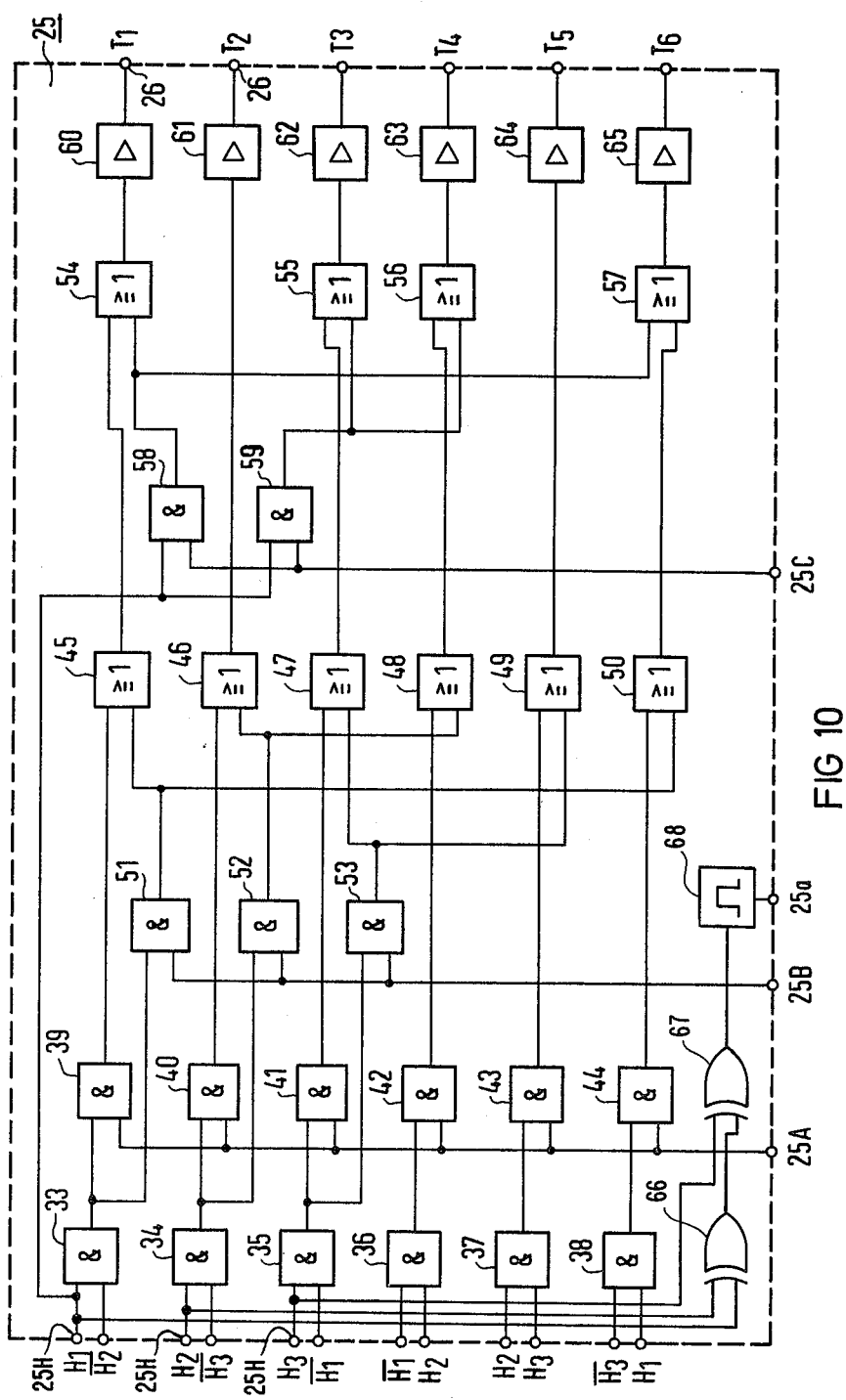
FIG. 10 is a function block representation of a control unit for controlling converter valves shown in FIG. 1.

FIG. 10 is a function block illustration of an embodiment example of control unit 25 which addresses converter valves 1 through 6 at speeds which lie within speed ranges I, II, and III.

At the same time, the switch of the auxiliary commutating device 29 is closed by means of signals coupled through two exclusive or gates 66 and 67 and a succeeding pulse generator, e.g., one shot multi-vibrator 68 responsive to both positive and negative transitions at its input, which provides an output at terminal 25a to initiate each commutation. During operation of control unit 25, each commutation is initiated upon the closing of auxiliary commutating switch 29. Control unit 25, as shown in FIG. 10, receives signals $\overline{H}_1$ to $\overline{H}_3$ at input terminals 25H. These signals are provided in pairs in accordance with the logic equations described hereinabove with respect to FIG. 3. Each of the paired signals is provided at a respective input 25H, each such pair being associated with one of a plurality of AND gates 33 through 38. Each of the AND gates is coupled at its output to an input terminal of a respectively associated one of further AND gates 39 to 44. The second inputs of AND gates 39 through 44 are connected in common to input terminal 25A which, as noted above, receives signal A from limit indicator 24. Each of AND gates 39 to 44 is coupled at its output to respective ones of OR gates 45 to 50.

Each of OR gates 45 through 50 is coupled at an input terminal thereof to an output terminal of a respective one of AND gates 39 to 44. The second inputs of OR gates 45 and 50 are coupled to the output terminal of AND gate 51; the second input terminals of OR gates 46 and 48 are coupled to the output terminal of AND gate 52, and the second input terminals of OR gates 47 and 49 are coupled to the output terminal of AND gate 53. AND gate 51 is coupled at a first input terminal to the output terminal of AND gate 33; AND gate 52 is coupled at a first input terminal to the output terminal of AND gate 34; and AND gate 53 is coupled at a first input terminal to the output terminal of AND gate 35. The respective second input terminals of AND gates 51, 52, and 53 are connected together to a terminal 25B which receives signal B from limit indicator 24 signifying operation of the machine in speed range II. A logical "1" signal at input terminal 25B produces the condition described hereinabove with respect to FIG. 5.

The output terminals of OR gates 45, 47, 48, and 50 are coupled to the first input terminals of respectively associated OR gates 54 through 57. The second input terminals of OR gates 54 and 57 are coupled to the output terminal of AND gate 58, and the second input terminals of OR gates 55 and 56 are coupled to the output terminal of AND gate 59. AND gates 58 and 59 receive at respective first input terminals the signal $H_1$ from rotor position transmitter 15. The second input terminals of AND gates 58 and 59 are connected together to an input terminal 25C which receives signal C from limit indicator 24, which signal indicates operation of the machine in speed range III.

If signal C assumes a logical "1" state, the logical situation of FIG. 6 is produced. The outputs of OR stages 54, 46, 55, 56, 49, and 57 are coupled to respective ones of pulse amplifiers 60 to 65, each of which is connected to one of outputs 26. Pulses $T_1$ to $T_6$ of the pulse rasters of FIGS. 3 to 6 are generated at output terminals 26.

Control unit 25, as shown in FIG. 10, operates in accordance with the following logic table for speed ranges I to III:

|  |  | A | B | C |
| --- | --- | --- | --- | --- |
| Speed range | I (FIG. 3) | 1 | 0 | 0 |
| Speed range | II (FIG. 5) | 0 | 1 | 0 |
| Speed range | III (FIG. 6) | 0 | 0 | 1 |

Figure 11:
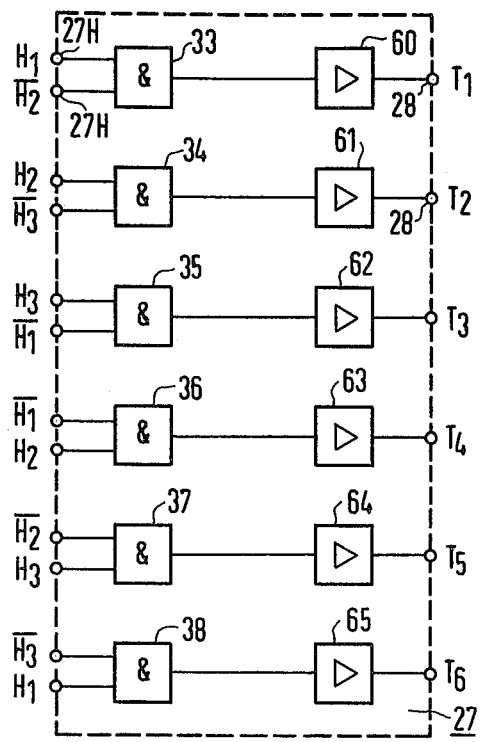
FIG. 11 is a function block representation of a control unit for generating firing pulses.

FIG. 11 is a function block representation of an illustrative embodiment of control unit 27 which generates firing pulses $T_1$ to $T_6$ for converter valves 1 to 6 of inverter WR when synchronous machine 10 is operating in the speed range above the minimum machine speed. In accordance with the logic represented by the pulse raster of FIG. 3, signals $\overline{H}_1$ to $\overline{H}_3$ are present in pairs at input 27H. As in the illustrative embodiment of control unit 25 in FIG. 10, input terminals 27H are coupled to respective ones of AND gates 33 to 38. The output terminals of AND gates 33 to 38 are connected to output terminals 28 by means of amplifiers 60 to 65. Thus, output terminals 28 produce firing pulses $T_1$ through $T_6$, in accordance with FIG. 3.

Figure 12:
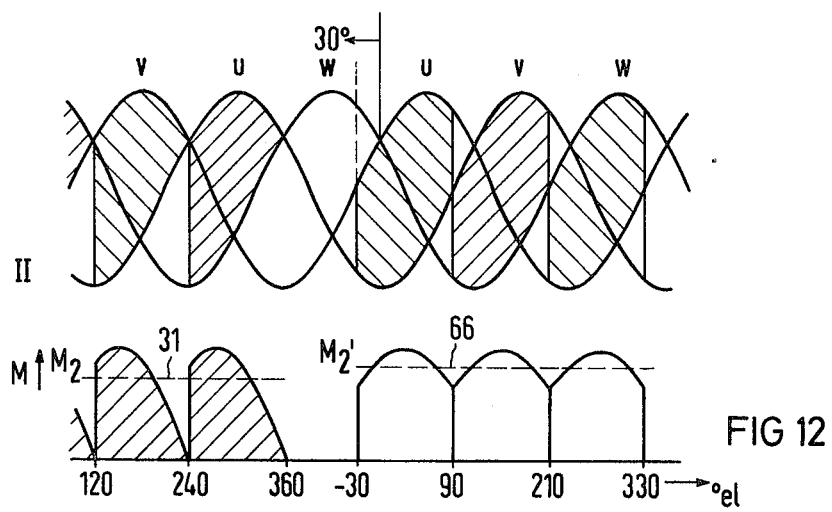
FIG. 12 shows a plurality of wave forms illustrating the manner in which average torque and torque ripple can be improved in the second speed range.

FIG. 12 shows voltage and torque wave forms which are helpful in describing the manner in which torque ripple can be improved in speed range II, and therefore corresponds in part to the wave forms plotted in FIG. 8. The left-hand portion of FIG. 12 represents a commutation process which is obtained as a result of the pulse raster of FIG. 4. As previously mentioned and shown in FIG. 12, commutation in accordance with the pulse raster of FIG. 4 produces the disadvantage that the forced commutation occurs at a point during machine rotation where torque is very small. Thus, this arrangement produces a relatively large increase in torque ripple.

The right-hand portion of FIG. 12 illustrates the manner in which torque ripple can be substantially improved during operation in speed range II. If control unit 25 is designed to permit firing of the electrical valves to be advanced by 30° during operation in speed range II, a torque wave form is produced which has very little torque ripple and mean torque $M_2'$ is substantially increased. As shown by dotted line 66, mean torque $M_2'$ is 83% of the peak value of the torque, as compared to 71% represented by mean torque line 31 ($M_2$).

Although the invention disclosed herein has been described in terms of specific embodiments and applications, it is to be understood that, in light of this teaching, persons skilled in the pertinent art can generate further embodiments and methods of operation without departing from the scope of the invention. The drawings and descriptions in this disclosure are proffered to facilitate comprehension of the invention, and should not be construed to limit the scope thereof.

What is claimed is:

1. A method for operating a frequency converter of the type having an auxiliary commutating device, an intermediate DC link, and an inverter with converter valves in a three-phase bridge circuit of the type having a pair of bridge halves, each bridge half having three converter valves in respective converter arms, at least one converter arm in each bridge half being connected to one another at a common main terminal; for supplying electrical energy to a rotating field machine, the rotating field machine having a predetermined minimum speed of machine operation, the method having the steps of operating the rotating field machine in a high speed range of operation which is greater than the predetermined minimum speed of machine operation; cyclically commutating the electrical energy six times during each rotation of the rotating field machine in response to rotation of the rotating field machine, the cyclical commutation being performed alternately between the bridge halves, and occurring from one converter arm to a subsequently current-carrying converter valve of a further one of the converter branches in the same bridge half, the method comprising the further steps of:

operating the rotating field machine in a first speed range of operation which is below the predetermined minimum speed of machine operation, said first speed range being between a zero speed of rotation of the rotating field machine and a first predetermined speed which is below the predetermined minimum speed of machine operation;

cyclically commutating the electrical energy via the converter valves six during each revolution of the rotating field machine while the rotating field machine is operating in said first speed range;

operating the rotating field machine in a second speed range of operation below the predetermined minimum speed of machine operation, said second speed range being between said first predetermined speed and a second predetermined speed, said second predetermined speed corresponding to the predetermined minimum speed of machine operation; and cyclically commutating the electrical energy via the converter valves three times during each revolution of the rotating field machine while the rotating field machine is operating in said second speed range, said cyclical commutation being performed in the converter branches of the two bridge halves of the three-phase bridge circuit so as to occur from the converter valve of a converter branch to a subsequently current-carrying converter valve of another converter branch.

2. The method of claim 1 wherein said second predetermined speed corresponds to a speed of machine operation which is higher than said first predetermined speed and below the predetermined minimum speed of machine operation, the method comprising the further steps of:

operating the rotating field machine in a third speed range of operation below the predetermined minimum speed of machine operation, said third speed range being between said second predetermined speed and said predetermined minimum speed of machine operation; and operating the three-phase bridge circuit as a single-phase bridge circuit by maintaining the pair of converter valves of the two converter branches which have the common main terminal in an unfired state.

* * * * *